United States Patent [19]
Huspen

[11] 3,727,389
[45] Apr. 17, 1973

[54] COLLAPSIBLE RAKE

[76] Inventor: Fred J. Huspen, 705 Lincoln Street, Glenview, Ill. 60025

[22] Filed: June 16, 1972

[21] Appl. No.: 263,633

[52] U.S. Cl. ............................................. 56/400.18
[51] Int. Cl. .............................................. A01d 7/00
[58] Field of Search ................... 56/400.17, 400.18, 56/400.19, 400.2; 294/53.5

[56] References Cited

UNITED STATES PATENTS

| | | | |
|---|---|---|---|
| 799,445 | 9/1905 | Butcher | 294/53.5 |
| 2,149,429 | 3/1939 | Finkes | 56/400.18 |
| 2,841,948 | 7/1958 | Zenowitz | 56/400.18 |
| 2,904,951 | 9/1959 | Glover | 56/400.18 |
| 3,258,903 | 7/1966 | Rienacker et al. | 56/400.18 |
| 3,394,536 | 7/1968 | Henne | 56/400.18 |

*Primary Examiner*—Russell R. Kinsey
*Attorney*—Axel A. Hofgren et al.

[57] ABSTRACT

An adjustable rake including an elongated handle having a transverse prong guide secured thereto at one end thereof. Mounted on the handle for slidable movement is a prong carrier and it in turn pivotally mounts respective ends of a plurality of prongs which extend therefrom through the prong guide. By changing the position of the carrier on the handle, the width of swath of the rake can be regulated. Means are provided for securing the prong carrier to the handle at any of several desired positions of adjustment.

6 Claims, 6 Drawing Figures

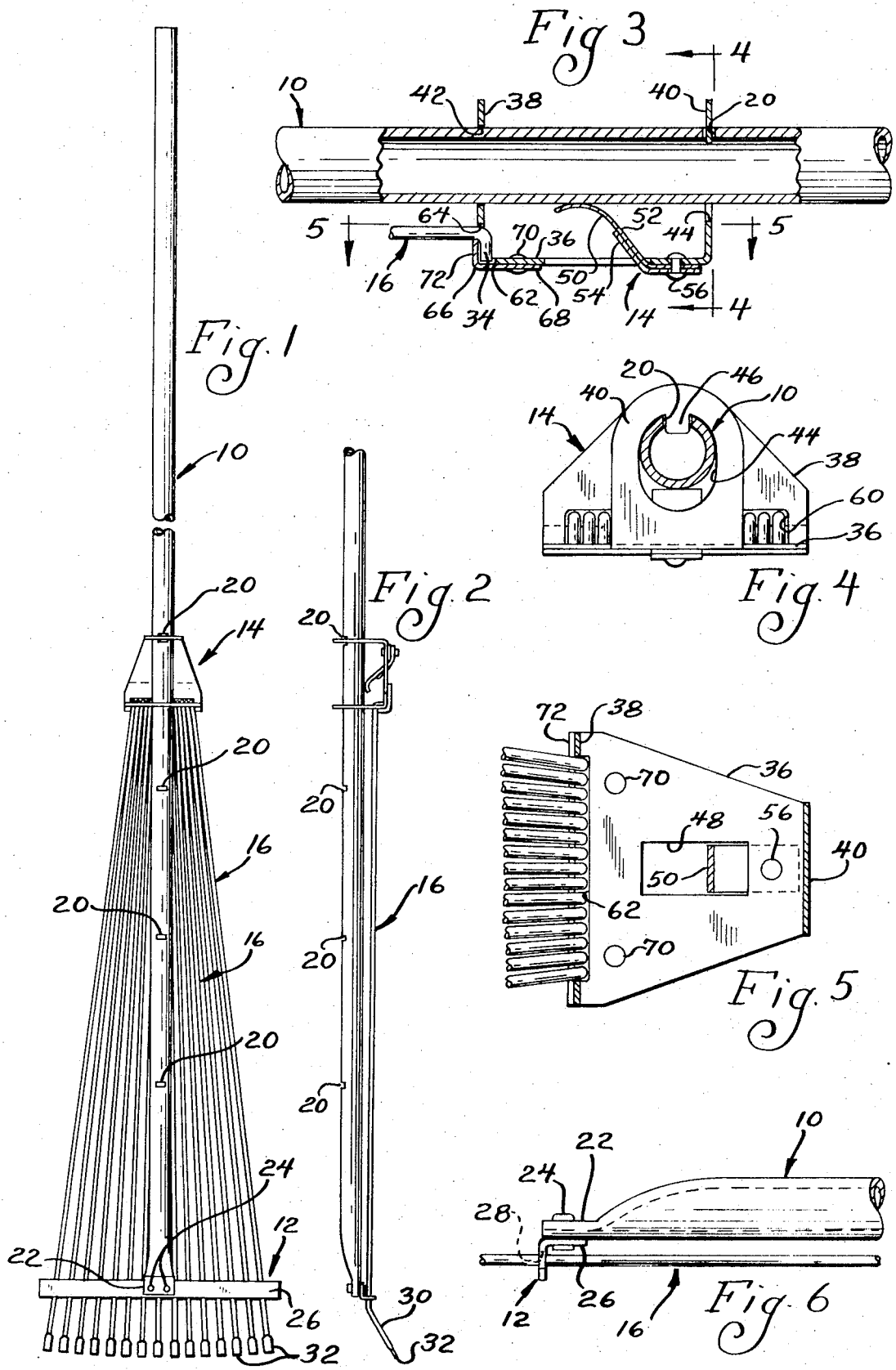

COLLAPSIBLE RAKE

BACKGROUND OF THE INVENTION

This invention relates to adjustable rakes.

In Reinacker et al U.S. Pat. No. 3,258,903 and Henne U.S. Pat. No. 3,394,536 there are disclosed adjustable rake constructions which may be used for hand cultivating purposes or for other purposes as, for example, raising the pile on a shag rug. Such rakes are adjustable in that each includes an elongated prong guide at one end of the handle as well as a prong carrier mounted for slidable movement on the handle in such a way that prongs extending between the prong carrier and the prong guide are moved outwardly as the prong carrier moves toward the prong guide. By selectively securing the prong carrier to the handle at a given location, a desired overall rake width may be selected and the distance between the work performing ends of the prongs may be selectively regulated for any of a variety of purposes.

SUMMARY OF THE INVENTION

It is the principal object of the present invention to provide a new and improved adjustable rake. More specifically, it is an object of the invention to provide such a rake including an economical but effective (1) means for securing the prong carrier at any of a plurality of desired locations to the handle, and (2) connection of the rake prongs to the prong carrier.

The exemplary embodiment of the invention achieves the foregoing objects in a construction including an elongated handle having a transversely extending prong guide at one end thereof. The handle slidably mounts a prong carrier and a securing means therefor which are configured in the form of a U-shaped sheet metal member.

More specifically, each of the legs of the U-shaped member are apertured for receiving the handle. The aperture in the leg nearest the prong guide conforms approximately to the cross section of the handle while the aperture in the leg furthest from the prong guide includes an inwardly extending tooth and is sized so that the handle may slide through the remainder of the aperture without interference with the tooth under circumstances to be described. The tooth preferably extends inwardly into the aperture toward the base of the U-shaped member and the adjacent surface of the handle is provided with a plurality of tooth receiving recesses.

The base of the U-shaped member mounts a spring which is engageable with the handle in such a way as to bias both the tooth and the handle towards each other. Such biasing will result in the prong carrier being firmly held in place when the tooth on the prong carrier is received in a tooth receiving recess in the handle while permitting the prong carrier to be skewed somewhat on the handle to remove the tooth from a recess to allow the prong carrier to be slidably moved on the handle if another position of adjustment is sought.

According to the preferred embodiment, the ends of the prongs carried by the prong carrier extend generally transversely to the length of the prongs and are received in an elongated slot formed both in the base of the U-shaped member and the leg of the same nearest the prong guide. The slot is dimensioned in conjunction with the length of the transverse ends so that the surface of the slot in the leg confines the prong ends against movement in one direction while the edge of the slot in the base confines the prong ends against movement in another direction. An L-shaped retaining member is secured to the base adjacent the slot and is positioned so that the two legs thereof respectively preclude movement of the prong ends relative to the prong carrier in the remaining two directions, while permitting the prongs to pivot about an axis substantially coincident with the longitudinal axis of the transverse ends of the prongs.

Other objects and advantages will become apparent from the following specification taken in conjunction with the accompanying drawings.

DESCRIPTION OF THE DRAWINGS

FIG. 1 is a side elevation of a rake made according to the invention;

FIG. 2 is a fragmentary side elevation of the rake and viewed from a direction approximately 90° to the view of FIG. 1;

FIG. 3 is an enlarged, fragmentary view of the prong carrier with parts shown in section;

FIG. 4 is a vertical section taken approximately along the line 4—4 of FIG. 3;

FIG. 5 is a horizontal section taken approximately along the line 5—5 of FIG. 3; and FIG. 6 is a fragmentary, enlarged view of the handle and prong guide.

DESCRIPTION OF THE PREFERRED EMBODIMENT

An exemplary embodiment of an adjustable rake made according to the invention is illustrated in the drawings, and with specific reference to FIG. 1, is seen to be comprised of four basic elements, including an elongated handle, generally designated 10; an enlongated prong guide, generally designated 12, and mounted on one end of the handle 10 and extending transversely thereto; a prong carrier, generally designated 14, slidably mounted on the handle 10; and a plurality of elongated prongs, each generally designated 16, pivotally secured to the prong carrier 14 and slidably received by the prong guide 12.

The handle 10, as viewed in FIGS. 3 and 4, is preferably formed of tubing and, specifically, of cylindrical tubing. As best viewed in FIG. 1, the surface of the same that would normally be uppermost when the rake is in use is provided with a plurality of spaced slots 20 which act as tooth receiving recesses for a tooth to be described hereinafter on the prong carrier 14 for fixedly securing the same in a desired position of adjustment along the length of the handle 10.

As viewed in FIG. 6, one end of the handle 10 is flattened as at 22 and rivets 24 are used to secure the prong guide 12 to the handl 10 at the flat end 22.

As seen in FIGS. 1, 2 and 6, the prong guide may be formed of an elongated piece of angle iron or the like and includes a leg 26 through which the rivets 24 pass and a second, transverse leg, having a plurality of prong receiving apertures 28 therein. The prong receiving apertures are spaced across the length of the prong guide 12, normally on about ½ inch centers. As is apparent from FIG. 1, the length of the prong guide 12 is substantially greater than that of the prong carrier 14 with the result that as the latter is advanced along the handle 10 towards the former, the prongs will spread. Depending upon the final location of the prong carrier on the handle 10, varying widths of swath and prong separations may be achieved.

Each of the prongs 16 has an angularly related work performing end 30 terminating in a flattened tooth or tip 32. The opposite end of each prong 16 includes a transverse end 34 as best seen in FIG. 3, which end is received by the prong carrier 14.

FIG. 3 also illustrates that the prong carrier 14 is a generally U-shaped member which may be formed of metal or the like. The same includes a base 36, a forward leg 38, which leg is the closest leg to the prong guide 12, and a rearward leg 40. The leg 38 includes an aperture 42 or opening therein and which is circular so as to slidably receive the handle 10. The leg 40 includes an opening 44 therein which, as seen in FIG. 4, is somewhat oblong and includes a tooth 46 therein extending in the direction of the base 36. As can be appreciated from an examination of the dimensions illustrated in FIG. 4, the distance between the lowermost end of the tooth 46 and the lowermost end of the aperture 44 is such that the handle 10 is freely slidable therein. As best seen in FIG. 5, the base 36 is trapezoidal in shape and includes a central opening 48. Referring to FIG. 3, a spring 50 comprised of spring members 52 and 54 is secured by a rivet 56 to the side of the base 36 adjacent the leg 40 and extends upwardly through the opening 48 to engage the handle 10 on a side thereof opposite the location of the slots 20. The spring 50 serves to bias the prong carrier 14 and the handle 10 with respect to each other so that the tooth 46 is urged into a tooth receiving recess defined by one of the slots 20. Of course, the bias applied by the spring 50 can be overcome by applying pressure to the right hand of the base 36 as viewed in FIG. 3 to move the tooth 46 up out of one of the recesses 20 at which time, the prong carrier 14 may be selectively moved along the length of the handle 10 to the desired position of adjustment whereat the tooth 46 may enter another one of the slots 20. Thus, the spring 50 in conjunction with the slots 20 and the tooth 46 serve as a means for selectively retaining the prong carrier 14 in a desired position of adjustment along the handle 10.

The prongs 16 are secured to the prong carrier 14 by means of a construction including an elongated slot 60 formed both in the leg 38 and the left-hand portion of the base 36. As perhaps best seen in FIG. 3, the slot 60 includes one edge 62 in the base 36 of another edge 64 in the leg 38. Preferably, the edge 64 is located above the lowest surface of the base 36, a distance just slightly greater than the length of the transverse ends 34 of the prongs while the edge 62 is located to the right of the leftmost surface of the leg 38 a distance just slightly greater than the thickness of the transverse ends 34. As a result, the edge 64 will preclude movment of the prongs 16 relative to the prong carrier 14 in an upward direction as viewed in FIG. 3 while the edge 62 will preclude such movement of the prongs 62 in a rightward direction as viewed in the same Figure.

To completely retain the prongs 16, the assemblage is also provided with an L-shaped retaining member 66. One leg 68 of the member 66 is secured by rivets 70 to the base 36 so that a portion of the leg 68 is closely adjacent the ends of the transverse ends 34 so as to preclude relative downward movement of the prongs as viewed in FIG. 3. An upstanding leg 72 of the L-shaped member 66 captures the ends 34 of the prongs 16 so as to preclude the same from moving to the left as viewed in FIG. 3 relative to the prong carrier 14. As a result of the foregoing construction, it will be appreciated that the prongs 16 are prevented from moving substantially relative to the prong carrier 16 except pivotally about an axis substantially coincident with the longitudinal axis of the transverse ends 34. Such a connection allows the spreading of the prongs 16 during movement of the prong carrier 14 toward the prong guide 12.

From the foregoing, it will be appreciated that a rake made according to the invention is relatively simple in construction and therefore can be fabricated economically. It will also be recognized that the same provides positive securing of the prong guide at various positions along the length of the handle 10 while not requiring any significant manual effort, as for example, the loosening of a bolt or the like, to loosen the prong carrier to change the position of adjustment. It will also be appreciated that the unique construction whereby the prongs are secured to the prong carrier is a simple one which is extremely effective while having the advantage of economical fabrication.

I claim:

1. An adjustable rake comprising: an elongated handle; a prong guide secured to the handle near an end thereof and extending transverse to the length thereof; a prong carrier slidably received on the handle; and a plurality of elongated prongs pivotally secured to the prong carrier and slidably received in the prong guide; said prong carrier including an opening through which said handle extends, and a tooth adjacent said opening directed toward said handle; said handle including a plurality of tooth receiving recesses spaced along at least a portion of the length thereof; and resilient means interposed between said prong carrier and said handle and opposite said tooth for normally urging said tooth into any one of said tooth receiving recesses to lock the prong carrier at a selected position of movement along the length of said handle.

2. An adjustable rake according to claim 1 wherein said prong carrier is generally U-shaped with said opening being located in one of the legs thereof, a second opening receiving said handle in the other leg thereof; said resilient means being interposed between said handle and the base of said U-shaped member.

3. An adjustable rake according to claim 2 wherein said resilient means comprises a spring member secured to the base of said U-shaped member and contacting said handle oppositely of said recesses.

4. An adjustable rake according to claim 2 wherein said second opening is in the leg of said U-shaped member nearest said prong guide, and said prongs include transverse ends received by said prong carrier; said prong carrier including an elongated slot therein at the junction of said base and said leg nearest said prong guide, said slot having a width corresponding approximately to the length of said transverse ends and extending generally transversely of the length of said legs; said transverse ends being received in said slot and in abutment with the edge of said slot in said base; and further including an L-shaped retaining member having one leg secured to said base below said transverse ends and a second leg extending therefrom to capture said transverse ends in said prong carrier.

5. An adjustable rake comprising: an elongated handle; a prong guide secured to the handle near an end thereof and extending transverse to the length thereof; a prong carrier slidably received on the handle; and a plurality of elongated prongs pivotally secured to the prong carrier and slidably received in the prong guide; said prong carrier including a member having an opening therein slidably receiving said handle and extending generally transversely to the axis thereof, said member further including an elongated recess bounded by edges generally transverse to each other and extending generally transversely to the length of said member; each of said prongs including transverse end portions having a length and a thickness so as to be received in said recess and be retained therein against movement in two directions by said edges, and further including a retaining element secured to said member and having a portion partially closing said recess for retaining said transverse ends therein against movement in the opposite directions while allowing pivoting of said prongs about an axis substantially coinciding with the longitudinal axis of said transverse ends.

6. The adjustable rake of claim 5 wherein said retaining member is an elongated, generally L-shaped member.

* * * * *